United States Patent
Kakaraparthy et al.

(10) Patent No.: US 11,817,011 B2
(45) Date of Patent: Nov. 14, 2023

(54) DYNAMICALY UPDATING DIGITAL VISUAL CONTENT VIA AGGREGATED FEEDBACK

(71) Applicant: INTERNATIONAL BUSINESS MACHINES CORPORATION, Armonk, NY (US)

(72) Inventors: Sreekanth L. Kakaraparthy, Bangalore (IN); Vijay A. Kumar, Bangalore (IN); Danish Contractor, New Delhi (IN); Seema Nagar, Bangalore (IN); Kuntal Dey, New Delhi (IN); Utkarsh Dwivedi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 16/249,016

(22) Filed: Jan. 16, 2019

(65) Prior Publication Data
US 2020/0226941 A1    Jul. 16, 2020

(51) Int. Cl.
G09B 5/02    (2006.01)
G06N 20/00    (2019.01)
G06F 3/01    (2006.01)

(52) U.S. Cl.
CPC ............... *G09B 5/02* (2013.01); *G06N 20/00* (2019.01); *G06F 3/013* (2013.01)

(58) Field of Classification Search
CPC ............ G09B 5/02; G06N 20/00; G06F 3/013
(Continued)

(56) References Cited

U.S. PATENT DOCUMENTS 9,426,421 B2    8/2016    Balasaygun et al.
11,157,074 B2 *   10/2021    Contractor ............... G09B 5/02
(Continued)

FOREIGN PATENT DOCUMENTS

WO    2017152215 A1    9/2017

OTHER PUBLICATIONS

Agoston Winkler, and Sándor Juhász. Automatic Rearrangement of Localized Graphical User Interface. International Journal of Computer, Electrical, Automation, Control and Information Engineering vol. 1, No. 3, 2007.
(Continued)

*Primary Examiner* — Robert P Bullington
(74) *Attorney, Agent, or Firm* — Joseph P. Curcuru; George S. Blasiak; Heslin Rothenberg Farley & Mesiti P.C.

(57) ABSTRACT

Digital teaching content ordering includes receiving, by a data processing system, digital teaching content and any corresponding annotations and content heuristic(s) from a teacher or other presenter, the digital teaching content including text and/or image(s). The data processing system monitors student gaze of the digital teaching content during a class and can cognitively skip some of the digital teaching content during the class based on the monitored student gaze and content heuristic(s). The system can also cognitively modify the digital teaching content outside of class based, in part, on the monitoring and the content heuristic(s). A hypergraph of the digital teaching content may also be received, the cognitively skipping being further based on the hypergraph, and the cognitively modifying being further based on a heat map built using the hypergraph and the student gaze.

25 Claims, 10 Drawing Sheets

(58) Field of Classification Search
USPC .......................................................... 434/428
See application file for complete search history.

(56) References Cited

U.S. PATENT DOCUMENTS

| | | |
|---|---|---|
| 2015/0099255 A1 | 4/2015 | Aslan et al. |
| 2017/0358233 A1 | 12/2017 | Cheng et al. |

OTHER PUBLICATIONS

Global Dossier Report to U.S. Appl. No. 16/249,016; dated Aug. 15, 2023; 1 page.

* cited by examiner

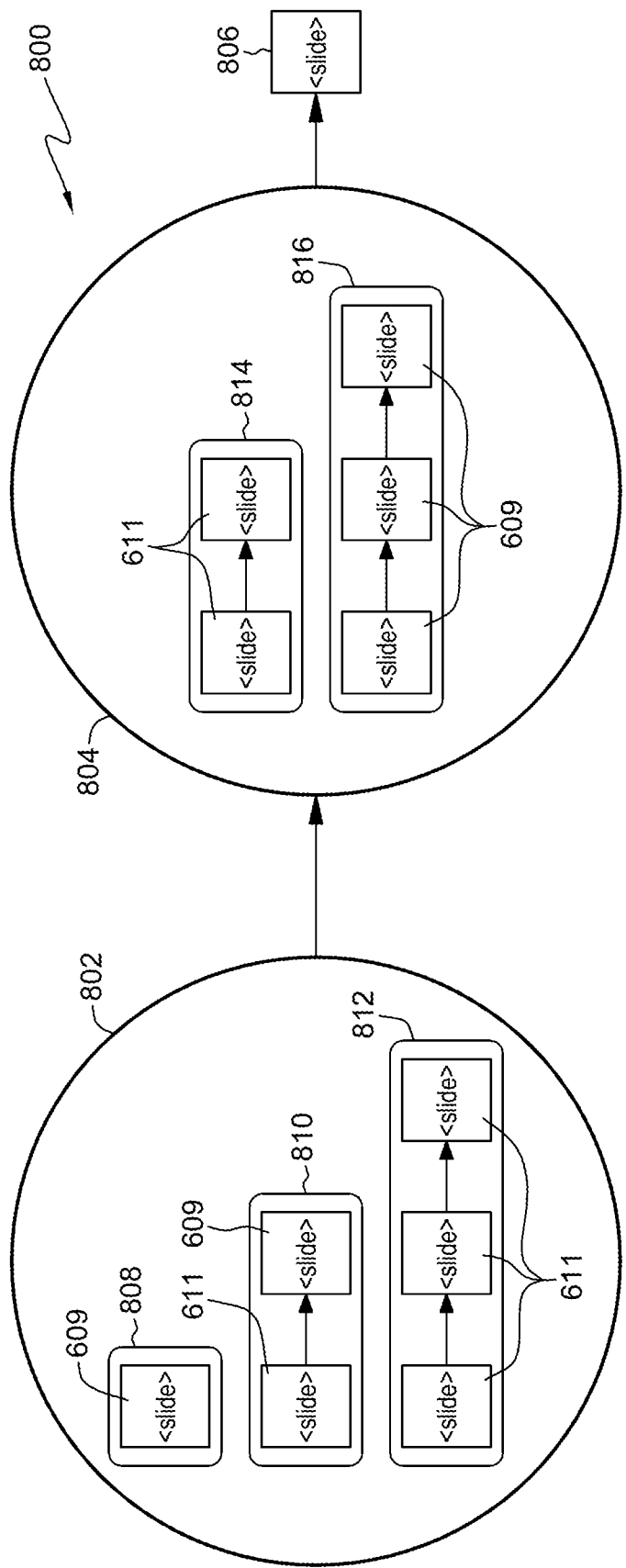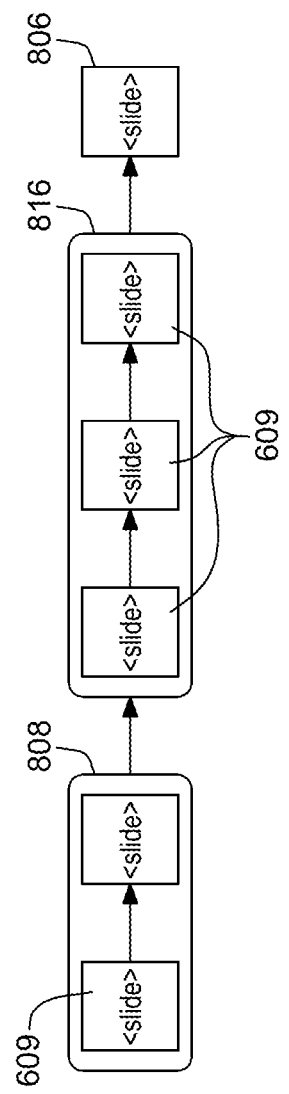
FIG. 8
FIG. 9

DYNAMICALY UPDATING DIGITAL VISUAL CONTENT VIA AGGREGATED FEEDBACK

BACKGROUND

Lecture presentations through text and image content, such as slides containing text and/or images, is a widespread teaching method in schools and colleges. Lectures are replicated over days, and semesters, and are the most common form of mass education. However, the classroom presentation material is seldom revised, due to the lack of time and motivation on the part of a busy lecturer. These revisions, as and when they happen, may not capture class attention dynamics, but only end of semester feedback or average assignment scores. Further, with large classrooms and short class times, a class session might not be able to fully connect or connect at all to the content in the reading material (books, MOOC video, animation).

SUMMARY

Shortcomings of the prior art are overcome and additional advantages are provided through the provision, in one aspect, of a computer-implemented method of ordering digital teaching content. The method includes: receiving, by a data processing system, digital teaching content and any corresponding annotations and one or more content heuristic from a teacher, wherein the digital teaching content comprises at least one of text and one or more image; monitoring, by the data processing system, student gaze of the digital teaching content during a class by a plurality of students; and cognitively skipping, by the data processing system, some of the digital teaching content during the class based on the monitoring and the one or more content heuristic.

In another aspect, a system for ordering digital teaching content may be provided. The system may include, for example, memory, at least one processor in communication with the memory, the memory storing program instructions executable by the at least one processor to perform a method. The method may include, for example: receiving, by a data processing system, digital teaching content and any corresponding annotations and one or more content heuristic from a teacher, wherein the digital teaching content comprises at least one of text and one or more image; monitoring, by the data processing system, student gaze of the digital teaching content during a class by a plurality of students; and cognitively skipping, by the data processing system, some of the digital teaching content during the class based on the monitoring and the one or more content heuristic.

In a further aspect, a computer program product may be provided. The computer program product may include a storage medium readable by a processor and storing instructions for performing a method. The method may include, for example: receiving, by a data processing system, digital teaching content and any corresponding annotations and one or more content heuristic from a teacher, wherein the digital teaching content comprises at least one of text and one or more image; monitoring, by the data processing system, student gaze of the digital teaching content during a class by a plurality of students; and cognitively skipping, by the data processing system, some of the digital teaching content during the class based on the monitoring and the one or more content heuristic.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 8 depicts another example of an initial hypergraph of digital teaching content, in accordance with one or more aspects of the present disclosure.

FIG. 9 depicts one example of a final ordering of the digital teaching content depicted in the hypergraph of FIG. 8, in accordance with one or more aspects of the present disclosure.

DETAILED DESCRIPTION

One or more aspect of this disclosure relate, in general, to digital visual content used, for example, in a class setting. More particularly, one or more aspect of the disclosure relate to automatically updating digital visual content used in, for example, a class setting based on aggregate student gaze of the digital material.

This disclosure addresses the noted problem, by using gaze of digital teaching content (more generally, "digital visual content") presented visually to all students in a class session. Gaze is used as a measure of classroom attention to the digital visual content. This is then used to cognitively reason how much content is to be provided for the particular topic, content is redesigned, skipped if needed, and/or reordered to reflect a more easily consumable version of the content using a hypergraph data structure.

A hypergraph of the digital teaching content and heuristics for the content are received from, for example, a teacher or an intermediary for the teacher. Next, a sequence of gaze points from a class session is gathered. The system then builds heat map(s) at a class level that is used to order the digital teaching content (e.g., material presented on slides) based, in one embodiment, on descending order of attention. The heuristics are then used to reason what level of content clarity is required, content is skipped if needed during the session, and/or rearranged after the class session.

As used herein, the term "fixation" refers to when the eye gaze pauses in a certain position, say while reading a text, viewing an image etc. For example, human eyes tend to fixate on a few words of a given sentence, as they read the sentence.

As used herein, the term "saccade" refers to when the eye gaze moves from one position to another (the movement is the saccade).

As used herein, the term "scanpath" refers to a sequence of fixations and saccades.

As used herein, the term "heat map" when used with respect to gaze, refers to an aggregate visual representation of the visual exploration patterns in a group of users. In these representations, the hot zones or zones with higher density designate where the users focused their gaze (not their attention) with a higher frequency and/or a higher total duration.

As used herein, the term "hypergraph" refers to a graph wherein each hypernode is a group of alternative related concepts (none of these is a background/dependent concept of another—one can replace another without breaking the remaining concept set present in the material), and each hyperedge connects a pair of hypernodes.

Figure 6:
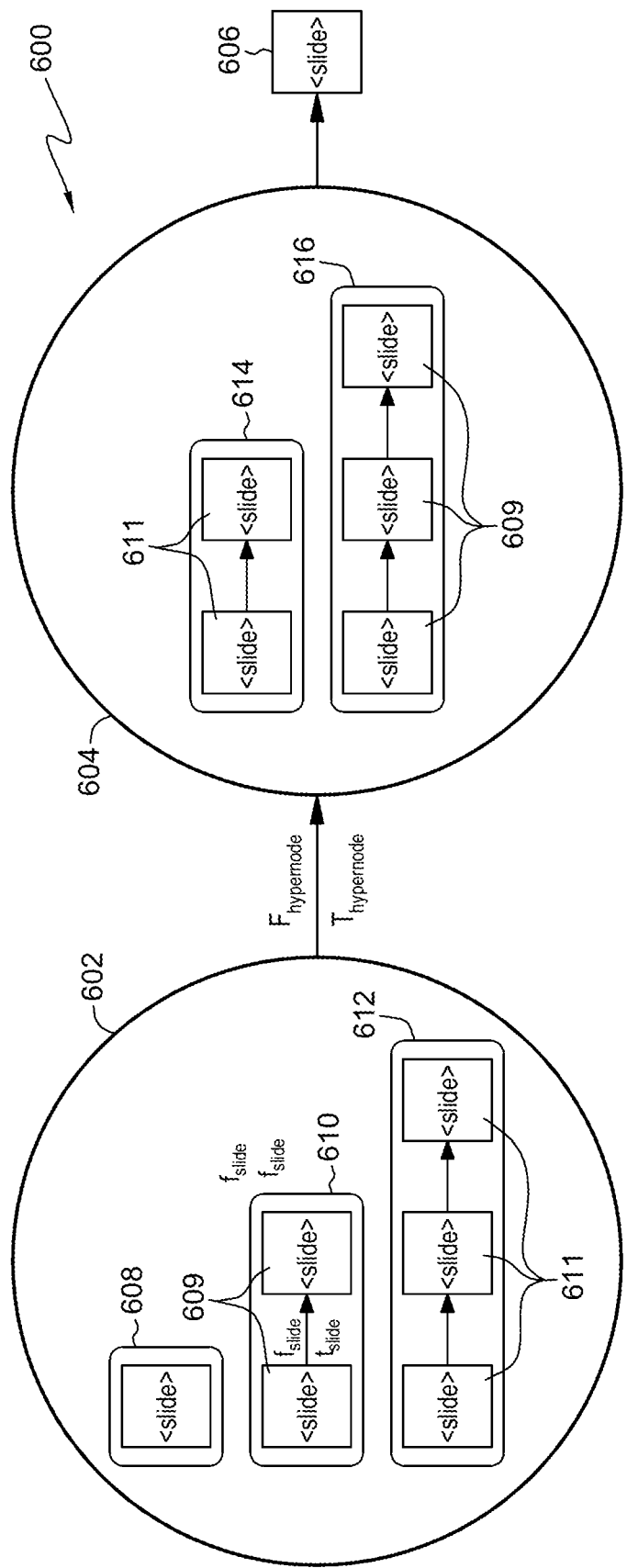
FIG. 6 depicts one example of an initial hypergraph of digital teaching content, in accordance with one or more aspects of the present disclosure.

For example, in FIG. 6, there are three hypernodes—the first one has three concept groups, while the second one has two concept groups and the third hypernode is a singleton "normal" graph node. This is discussed in more detail below.

The following explains one method to summarize class gaze.

Fixation is determined from the intersection of the gaze vector and the digital teaching content. The most widely used current technologies are video-based eye-trackers. A camera focuses on one or both eyes and records eye movement as the viewer looks at some kind of stimulus, in this case, digital teaching content. Most modern eye-trackers use the center of the pupil and infrared or near-infrared non-collimated light to create corneal reflections. The vector between the pupil center and the corneal reflections can be used to determine the point of regard on a surface or the gaze direction. A simple calibration procedure of the individual may be performed before using the eye tracker.

Two general types of infrared/near-infrared (also known as active light) eye-tracking techniques are common: bright-pupil and dark-pupil. Their difference is based on the location of the illumination source with respect to the optics.

If the illumination is coaxial with the optical path, then the eye acts as a retroreflector as the light reflects off the retina creating a bright pupil effect similar to red eye. If the illumination source is offset from the optical path, then the pupil appears dark because the retroreflection from the retina is directed away from the camera.

Bright-pupil tracking creates greater iris/pupil contrast, allowing more robust eye-tracking with all iris pigmentation, and greatly reduces interference caused by eyelashes and other obscuring features. It also allows tracking in lighting conditions ranging from total darkness to very bright.

Another, less used, method is known as passive light. It uses visible light to illuminate, something which may cause some distractions to users. Another challenge with this method is that the contrast of the pupil is less than in the active light methods, therefore, the center of iris is used for calculating the vector instead. This calculation needs to detect the boundary of the iris and the white sclera (limbus tracking). It presents another challenge for vertical eye movements due to obstruction of eyelids.

Eye-tracking setups vary greatly: some are head-mounted, some require the head to be stable (for example, with a chin rest), and some function remotely and automatically track the head during motion. Most use a sampling rate of at least 30 Hz. Although 50/60 Hz is more common, today many video-based eye trackers run at 240, 350 or even 1000/1250 Hz, speeds needed in order to capture fixational eye movements or correctly measure saccade dynamics.

Eye movements are typically divided into fixations and saccades—when the eye gaze pauses in a certain position, and when it moves to another position, respectively. The resulting series of fixations and saccades is called a scanpath. Smooth pursuit describes the eye following a moving object. Fixational eye movements include microsaccades: small, involuntary saccades that occur during attempted fixation. Most information from the eye is made available during a fixation or smooth pursuit, but not during a saccade.

Scanpaths are useful for analyzing cognitive intent, interest, and salience. Other biological factors may affect the scanpath as well. Eye tracking in human-computer interaction (HCI) typically investigates the scanpath for usability purposes, or as a method of input in gaze-contingent displays, also known as gaze-based interfaces.

Eye-trackers necessarily measure the rotation of the eye with respect to some frame of reference. This is usually tied to the measuring system. Thus, if the measuring system is head-mounted, as with EOG or a video-based system mounted to a helmet, then eye-in-head angles are measured. To deduce the line of sight in world coordinates, the head must be kept in a constant position or its movements must be tracked as well. In these cases, head direction is added to eye-in-head direction to determine gaze direction.

If the measuring system is table-mounted, as with scleral search coils or table-mounted camera ("remote") systems, then gaze angles are measured directly in world coordinates. Typically, in these situations head movements are prohibited. For example, the head position is fixed using a bite bar or a forehead support. Then a head-centered reference frame is identical to a world-centered reference frame. Or colloquially, the eye-in-head position directly determines the gaze direction.

Some results are available on human eye movements under natural conditions where head movements are allowed as well. The relative position of eye and head, even with constant gaze direction, influences neuronal activity in higher visual areas.

For all gaze vectors, determine the following fixation features, that can potentially be stored as a part of the third entry (fixation features entry) of the above triplet (i.e., in FIG. 6): total fixation duration (TFD); number of fixation durations (NF); average fixation durations (AFD); total time tracked per slide (TTT); percentage of viewing time (PVT); and total fixation duration on content zones (TFP). TFD is the total duration of eye gaze fixation to a given material, NF is the number of times the eye gaze fixated, AFD=TFD/NF, TTT is simply the total time the system could track the viewing behavior of students towards a given slide, PVT is the percentage of time the students at all viewed the screen and TFP is the total time duration of eye gaze fixation towards a zone of content.

Using these, a percentage of time spent in the content zone (PTZ)=TFP/TVS, where TVS is the total visual saliency. That is, if a content page/slide has, for example, three visually salient zones (content zones that the students would look at), and if the total fixation duration on the page/slide is 120 seconds, then PTZ=120/3=40.

A cluster average of saccade paths (ASP)=nearest vectors of saccade paths averaged to find set of average saccade paths.

In one example, the digital teaching content may include metadata. Adding metadata involves tagging content type (e.g., text, image), a topic of each content region unit. For example, a content region unit may include: one slide of a presentation application, a concept area marked by a teacher, or an automatically derived concept zone using existing Natural Language Understanding (NLU) techniques. Adding metadata may further include a minimum understanding required (notion of importance, i), minimum attention required (notion of effort, e), min and max time of show for content region unit.

Similar to the hypergraph, for purposes of the present application, how the heuristic(s) are generated is not relevant, only that the heuristic(s) is provided. In one example, the teacher can define heuristics for preferring a particular type or source of content.

Define a min and max total time of lecture to be put as a constraint. Next, a sequence of gaze points from a class session is gathered using, for example, a single monocular camera. During a class, summary statistics and a heat map are generated at the class level to assign an attention score to each element in each content region for all the content regions (notion of attention, a).

Then the system builds a class-level heat map that is used to rate the content based in descending order of attention. In one example, the ratings may subsequently be used in ordering the digital teaching content. The generated heat map may also be used for other purposes.

For each content region unit, maintain a tuple, <content-id, i importance, and effort e>. Compute an attention score for nearest content, based on a maximum area overlap. Here, "maximum area overlap can be thought of as a Venn diagram kind of overlap—which area receives eye gaze, and which content zone is physically overlapping the most with this area. Attention score(a)=f (average time on content as a percentage of total time on the content region unit, physical area of rendered content, cluster average of saccadepaths (ASP)). This refers to how attentive a student was, to a given region where a given content of given type was shown.

Next, construct <content-id, i, e, a> for each content region unit and compute average attention.

The heuristic(s) are then used to reason what level of content clarity is required. In one example, low attention observed over some of the digital teaching content that has high importance and high attention requirement, allows the system to reason low understanding for that content, thus new content with greater clarity is required. For each content region unit in each hypernode, factor the average f(i, e) by a, such that high attention, high importance, low effort of the content region units are given the lowest edge weights. Thus, $f^{new}_{slide}=\Omega(f_{slide}(i.e.), a_{slide})$. Next, find set of content region units that minimize the shortest f and least total time of slides (T). Accordingly, the newer version of the slide content is a function of the older version of the slide content, scaled with the attention at its different parts/zones.

As the attention scores are being generated, in real time: calculate the T and shortest f scores iteratively. Here f is function that determines the change in slide content when moving from the older to the newer slide. Calculate whether the shortest f or T scores change beyond a predefined threshold (e.g., defined by the teacher); drop the next content region units in the node or send an alert to the teacher so that the f and T are maintained. Retain the content regions with favorable f, T scores or a combination of f and T at each hypernode, and drop the remaining concept groups in each hypernode except the one retained concept. The retained path becomes the dynamically generated learning pathway that factors for the student group attention and understanding in the class.

As used herein, the term "digital teaching content" refers to any and all digital content presented visually by a teacher to a class for the purpose of teaching the class. Digital teaching content includes, for example, text and/or image(s). The term also includes any annotations or other entries made by the teacher to the digital teaching content. In one example, the digital teaching content is in the form of slides from a presentation program. More broadly, the term "digital visual content" can be applied similarly, but not necessarily teaching in a classroom setting. For example, it could be used at financial, marketing or other business settings in which the digital visual content is used and the presentation is repeated at least twice.

As used herein, the term "gaze" when used with regard to students or attendees in a class or lecture or presentation, refers to where student(s) eyes are looking at the digital teaching content being presented visually.

As used herein, the term "cognitively skipping" refers to the use of cognitive computing to determine, during a class, whether some digital teaching content should be skipped and skipping it, the determining based on the content heuristic(s) provided by the teacher and in-class monitoring of student gaze with respect to the digital teaching content.

As used herein, the term "cognitively modifying" refers to the use of cognitive computing to automatically modify digital teaching content outside of class based on a hypergraph of student gaze with regard to the digital teaching content during a class session and content heuristic(s) provided by the teacher. The modifying can include adding new digital teaching content, revising one or more portion of the digital teaching content, and removing some of the digital teaching content.

As used herein, the term "heuristics" when used with digital teaching content refers generally to a "flow" of the digital teaching content, and more specifically to dependencies between content regions of the digital teaching content, which may be provided by the teacher. For example, it may be that one content region defines terms, while another content region includes an example in which the terms are used. In one embodiment, the teacher provides the heuristics to the system.

A heat map (or heatmap) is a graphical representation of data where the individual values contained in a matrix are represented as colors or in gray scale.

Web heat maps are used for displaying areas of a Web page most frequently scanned by visitors. For example, web heat maps are often used alongside other forms of web analytics and session replay tools.

In mathematics, a hypergraph is a generalization of a graph in which an edge can join any number of vertices. Formally, a hypergraph H is a pair H=(X, E) where X is a set of elements called nodes or vertices, and E is a set of non-empty subsets of X called hyperedges or edges. Therefore, E is a subset of P(X)\{Ø}, where P(X)} is the power set of X.

While graph edges are pairs of nodes, hyperedges are arbitrary sets of nodes, and can therefore contain an arbitrary number of nodes. However, it is often desirable to study hypergraphs where all hyperedges have the same cardinality; a k-uniform hypergraph is a hypergraph such that all its hyperedges have size k. (In other words, one such hypergraph is a collection of sets, each such set a hyperedge connecting k nodes.) So a 2-uniform hypergraph is a graph, a 3-uniform hypergraph is a collection of unordered triples, and so on.

A hypergraph is also called a set system or a family of sets drawn from the universal set X. The difference between a set system and a hypergraph is in the questions being asked. Hypergraph theory tends to concern questions similar to those of graph theory, such as connectivity and colorability, while the theory of set systems tends to ask non-graph-theoretical questions.

There are variant definitions; sometimes edges must not be empty, and sometimes multiple edges, with the same set of nodes, are allowed.

Figure 1:
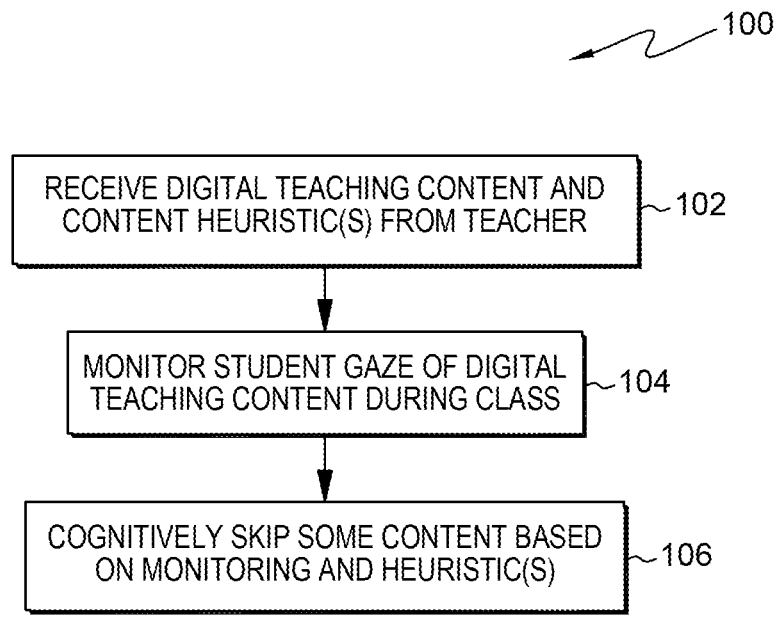
FIG. 1 is a flow diagram for one example of a computer-implemented method of ordering digital teaching content, in accordance with one or more aspects of the present disclosure.

FIG. 1 is a flow diagram 100 for one example of a computer-implemented method of ordering digital teaching content, in accordance with one or more aspects of the present disclosure. The method begins with receiving 102, by a data processing system, as described herein, digital teaching content and content heuristic(s) from a teacher, for example, over a network (e.g., the Internet). The digital teaching content includes, for example, text and/or image(s). During a class session, the data processing system monitors 104 student gaze of the digital teaching content. Based on student gaze, the data processing system can cognitively skip 106 material (with notice to the teacher) determined not to be needed.

Figure 2:
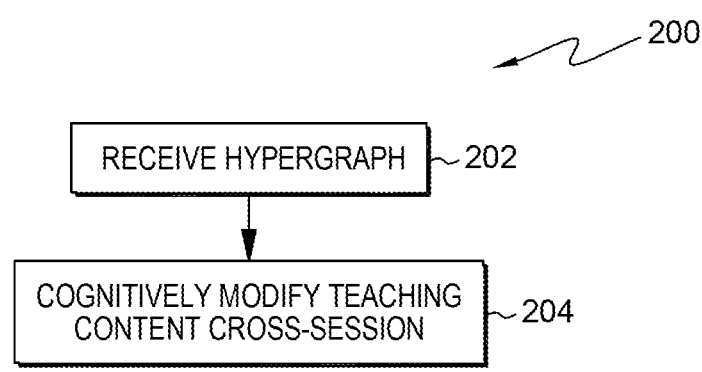
FIG. 2 is a flow diagram for automatically cognitively modifying digital teaching content during class, in accordance with one or more aspects of the present disclosure.

FIG. 2 is a flow diagram 200 for automatically cognitively modifying digital teaching content during class, in accordance with one or more aspects of the present disclosure. FIG. 2 essentially replaces cognitively skipping 106 in FIG. 1, though of course both can be done. The system receives 202 a hypergraph. More specifically, a hypergraph of the digital teaching content, and any annotations of the digital teaching content for subsequently reordering the same, are received by the data processing system, for example, from the teacher. For purposes of this disclosure, how the teacher prepares, or has prepared, the hypergraph is not relevant; only that one is provided. With the hypergraph, the system cognitively modifies 204 the digital teaching content cross-session, i.e., between sessions of the class.

Figure 3:
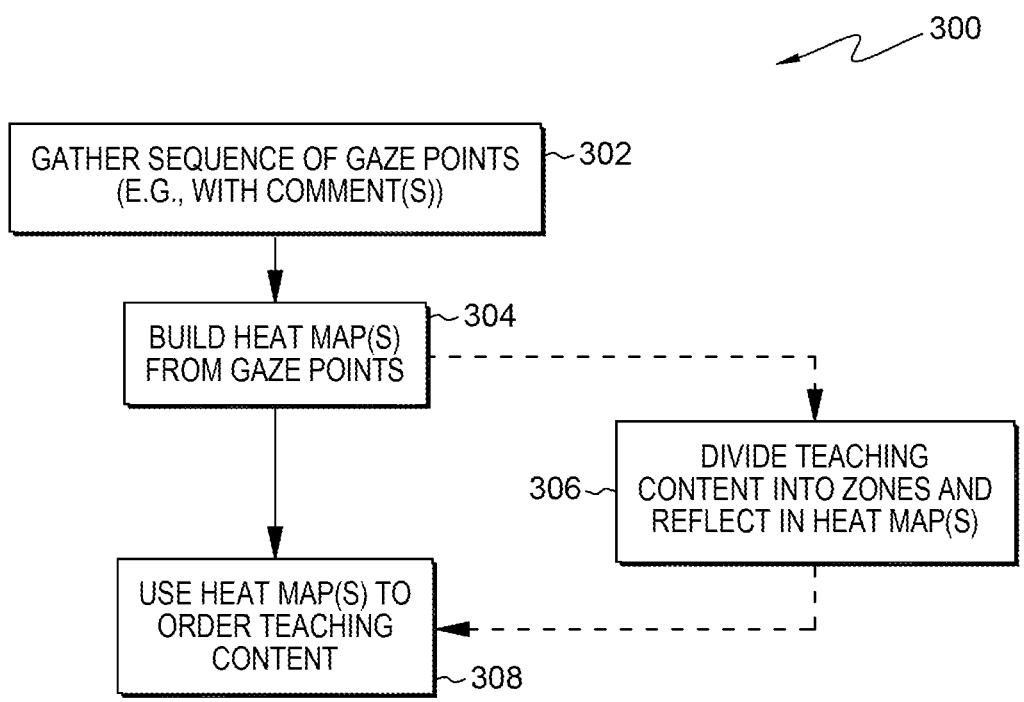
FIG. 3 is a flow diagram for a more detailed example of using heat maps to order electronic teaching content, in accordance with one or more aspects of the present disclosure.

FIG. 3 is a flow diagram 300 for a more detailed example of using heat maps to order electronic teaching content, in accordance with one or more aspects of the present disclosure. A sequence of gaze points are gathered 302, which may include one or more comment. Heat map(s) are built 304 from the gaze points. Optionally, the digital teaching content can be divided 306 into zones that are reflected in the heat map(s). In either case, the heat map(s) are then used 308 to order the digital teaching content.

Figure 4:
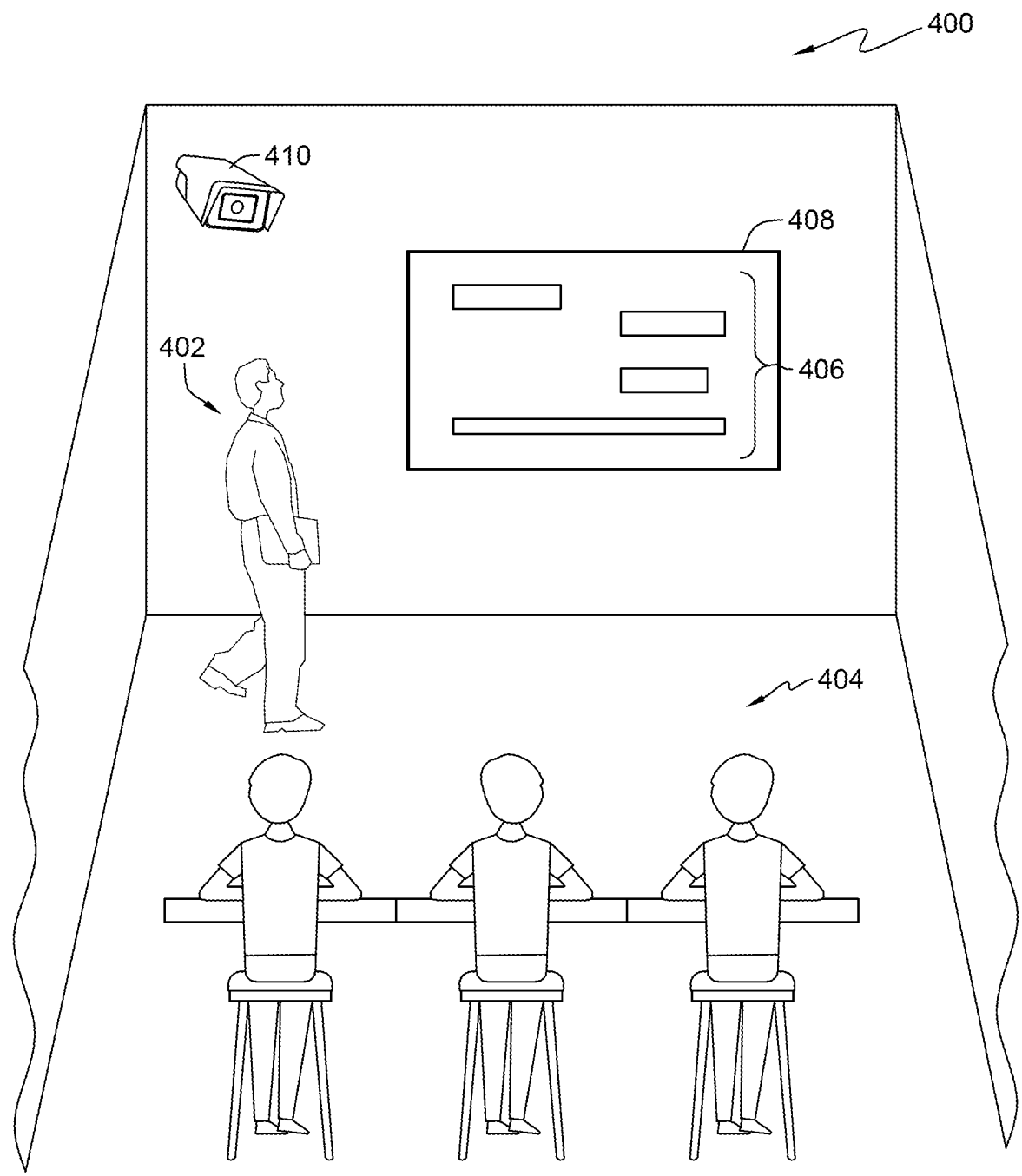
FIG. 4 depicts one example of a classroom during a teaching session, in accordance with one or more aspects of the present disclosure.

FIG. 4 depicts one example of a classroom 400 during a teaching session, in accordance with one or more aspects of the present disclosure. The classroom, in this example, includes a lecturer 402 discussing a topic with a class 404 of students with digital teaching content 406 being visually shown to the class via display 408. In one example, the digital teaching content includes a group of slides from a presentation application. While the class is in session, a video camera 410 tracks student gaze on the digital teaching content.

Figure 5:
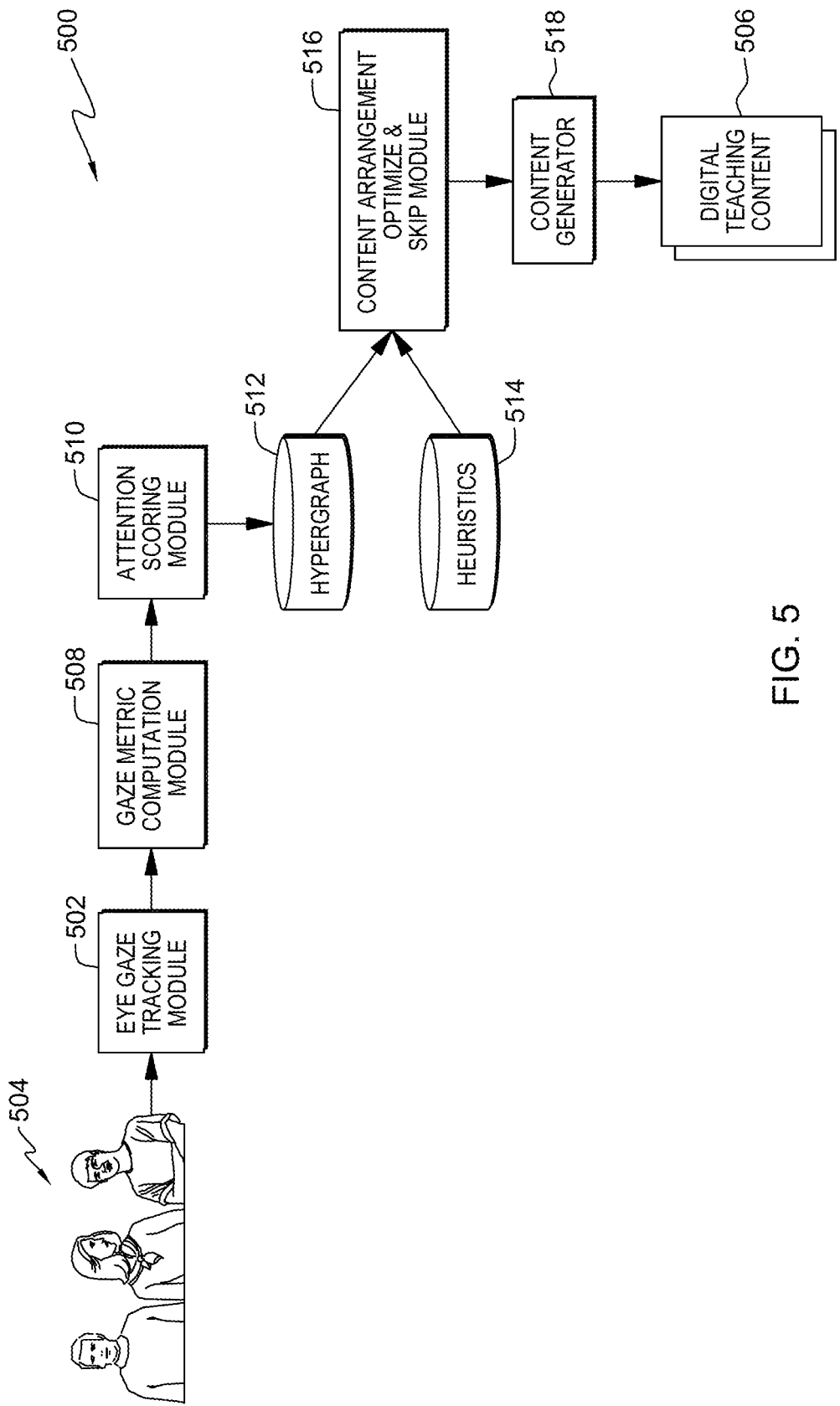
FIG. 5 is a modified block diagram of one example of a system architecture for automatically performing the cognitive functions described herein, in accordance with one or more aspects of the present disclosure.

FIG. 5 is a modified block diagram of one example of a system architecture 500 for automatically performing the cognitive functions described herein, in accordance with one or more aspects of the present disclosure. Eye gaze tracking module 502 tracks the gaze of students 504 on digital teaching content 506. A gaze metric computation module 508 calculates the gaze (e.g., average gaze) as described above. An attention scoring module 510 scores attention of the students on the digital teaching content. In one example using presentation slides, each slide could be logically partitioned into zones and the attention scoring module can provide scores for all the zones. A hypergraph 512 of the digital teaching content and heuristics 514 are used by a content arrangement optimize and skip module 516 to cognitively determine an optimum arrangement of the digital teaching content and determining what, if any, of the digital teaching content could be skipped. Where it is determined, for example, that the student gaze for particular portions of the digital teaching content is too low, a content generator 518 may be used to automatically generate digital teaching content, for example, adding additional details to the digital teaching content or replacing some of the digital teaching content. In that regard Natural Language Understanding (NLU), discussed in more detail below, can be used to process the digital teaching content for understanding its intended meaning. In addition, the digital teaching content and NLU output could be stored (e.g., in a database) for machine learning.

FIG. 6 depicts one example of an initial hypergraph 600 of digital teaching content, in accordance with one or more aspects of the present disclosure. The hypergraph includes three hypernodes 602, 604 and 606. Hypernodes 602 and 604 each have two or more concept groups, which are fungible. The first hypernode includes three concept groups 608, 610 and 612. Concept group 610 includes two slides 609, while concept group 612 includes three slides 611. Slides 609 are different from slides 611. Slides 609 have the lowest $f_{slide}$ score of the three concept groups. Similarly, in hypernode 604, slides 609 have a lower $f_{slide}$ score than slides 611.

Figure 7:
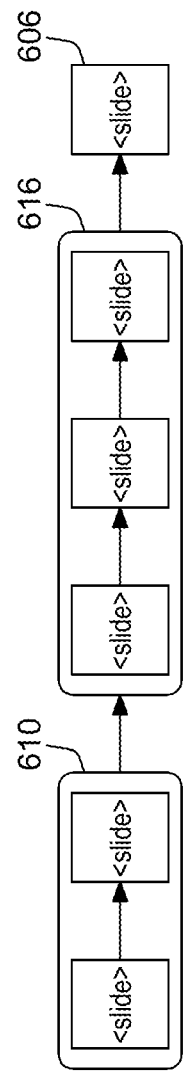
FIG. 7 depicts one example of a final ordering of the digital teaching content depicted in the hypergraph of FIG. 6, in accordance with one or more aspects of the present disclosure.

FIG. 7 depicts one example of a final ordering of the digital teaching content depicted in the hypergraph of FIG. 6, in accordance with one or more aspects of the present disclosure. The final arrangement includes concept groups 610, 616 and 606.

FIG. 8 depicts another example of an initial hypergraph 800 of digital teaching content, in accordance with one or more aspects of the present disclosure. The hypergraph includes three hypernodes 802, 804 and 806. Hypernodes 802 and 804 each have two or more concept groups, which are fungible. The first hypernode 802 includes three concept groups 808, 810 and 812. Concept group 810 includes two slides 611 and 609, while concept group 812 includes three slides 611. Slide 609 is different from slides 611. Slide 609 in concept group 808 (also in 810) has the lowest $f_{slide}$ score of the three concept groups. Similarly, in hypernode 804, slides 609 have a lower $f_{slide}$ score than slides 611.

FIG. 9 depicts one example of a final ordering of the digital teaching content depicted in the hypergraph of FIG. 8, in accordance with one or more aspects of the present disclosure. The final arrangement includes concept groups 808, 816 and 806.

Figure 10:
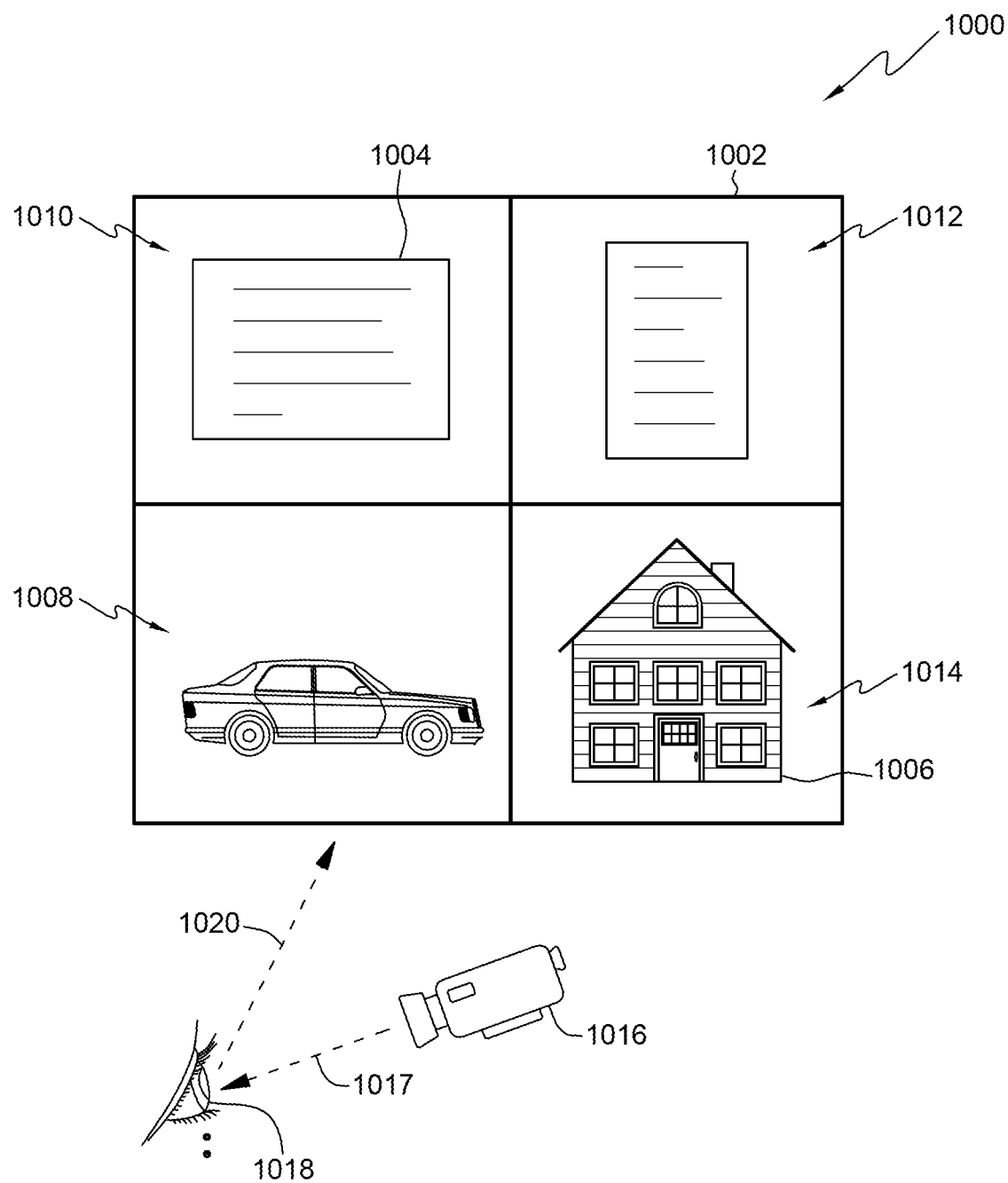
FIG. 10 depicts another example of a classroom teaching session with the digital teaching content being partitioned into zones, in accordance with one or more aspects of the present disclosure.

FIG. 10 is a modified block diagram for one example of a classroom teaching session 1000, in accordance with one or more aspects of the present disclosure. A display 1002 of digital teaching content, the content including, for example, text (e.g., text 1004) and image(s) (e.g., image 1006). The display is divided into at least two zones or content regions, for example, content regions 1008, 1010, 1012 and 1014. Although four content regions are shown, it will be understood that there could be more or less content regions. In one embodiment, the teacher defines the content regions as part of the initial information provided to the system, i.e., the digital teaching content on heuristic(s). In another embodiment, the system defines one or more content region, all defined by the system or a combination of teacher defined and system defined. In one example, the system can use image recognition to define an image as a content region. In another example, the system can use Natural Language Understanding (described more fully below) to identify and define text as a content region. A gaze detection apparatus 1016, for example, a camera (e.g., a monocular camera) or other imaging apparatus, detects gaze points 1017 during a class from the eyes 1018 of students as they view 1020 content region(s) in the displayed digital teaching content.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

Certain embodiments herein may offer various technical computing advantages involving computing advantages to address problems arising in the realm of computer networks. Particularly, computer networks operating to provide digital visual content presented by a presenter. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can cognitively skip some of the digital teaching content during the class based on student gaze and content heuristic(s). Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

In one example, a cognitive computer system performs an analysis of digital visual content or participant facial and/or eye movements. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, terms in the form of "cognitive <function>" refers to the use of cognitive computing in performing the function. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

In one example, a machine learning process can update one or more process run, based on obtained data to improve and accuracy and/or reliability of the one or more process. In one embodiment, for example, a decision data structure for various functions herein may be used.

In one embodiment, a number of instances of such a decision data structure may be active, each instance for a different user. Such a machine learning process can continually or periodically update the relevant factors of the different instances of the decision data structure.

An NLU process to process data for preparation of records that are stored in a data repository and for other purposes. In one example, a Natural Language Understanding (NLU) process can be used to process for determining one or more NLU output parameter of a text, for example. Such an NLU process can include one or more of a topic classification process that determines topics of text and output one or more topic NLU output parameter. Running such an NLU process allows to perform a number of processes.

In a first aspect, disclosed above is a computer-implemented method of ordering digital teaching content. The computer-implemented method includes: receiving, by a data processing system, digital teaching content and any corresponding annotations and content heuristic(s) from a teacher, the digital teaching content including at least one of text and image(s); monitoring, by the data processing system, student gaze of the digital teaching content during a class; and cognitively skipping, by the data processing system, some of the digital teaching content during the class based on the monitoring and the content heuristic(s).

In one example, the computer-implemented method may further include, for example, cognitively modifying, by the data processing system, the digital teaching content outside of class based, in part, on the monitoring and the content heuristic(s). In one example, the receiving may further include, for example, receiving, by the data processing system, a hypergraph of the digital teaching content from the teacher, the cognitively skipping being further based on the hypergraph, and the cognitively modifying being further based on a heat map built using the hypergraph and the student gaze.

In one example, the cognitively modifying may include, for example, at least one of generating new digital teaching content, removing some and less than all of the digital teaching content and reordering at least some of the digital teaching content. In one example, the cognitively modifying may include, for example, determining, by the data processing system, a level of clarity needed for content(s) of the digital teaching content using, at least in part, the content heuristic(s).

In one example, the computer-implemented method may further include, for example, building, by the data processing system, heat map(s) from a sequence of gaze points of the student gaze, a predetermined unit of the digital teaching content being divided into zones, the monitoring including tracking gaze time of the students on each of the zones, and the heat map(s) reflects the gaze time. In one example, the computer-implemented method may further include, for example, prior to the cognitively skipping and the cognitively modifying, ordering, by the data processing system, the digital teaching content in descending order of attention based on the heat map(s).

In one example, the gathering may include, for example, using, by the data processing system, camera(s) to observe student(s) in the class and obtain the sequence of gaze points.

In one example, the computer-implemented method of the first aspect may further include, for example, using machine learning for the data processing system to improve at least one of the cognitively skipping and the cognitively modifying.

In one example, the monitoring in the computer-implemented method of the first aspect may include, for example, gathering, by the data processing system, a sequence of gaze points, the method further including building, by the data processing system, heat map(s) from the sequence of gaze points.

In a second aspect, disclosed above is a system for ordering digital teaching content. The system includes: a memory; and processor(s) in communication with the memory, the memory storing program code to perform a method. The method includes: receiving, by a data processing system, digital teaching content and any corresponding annotations and content heuristic(s) from a teacher, the digital teaching content including at least one of text and image(s); monitoring, by the data processing system, student gaze of the digital teaching content during a class; and cognitively skipping, by the data processing system, some of the digital teaching content during the class based on the monitoring and the content heuristic(s).

In one example, the system may further include, for example, cognitively modifying, by the data processing system, the digital teaching content outside of class based, in part, on the monitoring and the content heuristic(s), the receiving further includes receiving, by the data processing system, a hypergraph of the digital teaching content from the teacher, the cognitively skipping being further based on a heat map built using the hypergraph and the student gaze, and the cognitively modifying being further based on the hypergraph. In one example, the system may further include, for example, building, by the data processing system, heat map(s) from a sequence of gaze points of the student gaze, a predetermined unit of the digital teaching content is divided into zones, the monitoring includes tracking gaze time of the students on each of the zones, and the heat map(s) reflects the gaze time.

In one example, the system of the second aspect may further include, for example, cognitively modifying, by the data processing system, the digital teaching content outside of class based, in part, on the monitoring and the content heuristic(s), the cognitively monitoring includes gathering, by the data processing system, a sequence of gaze points, the method further including building, by the data processing system, heat map(s) from the sequence of gaze points.

In one example, the system of the second aspect may further include, for example: cognitively modifying, by the data processing system, the digital teaching content outside of class based, in part, on the monitoring and the content heuristic(s); and machine learning for the data processing system to improve at least one of the cognitively skipping and the cognitively modifying.

In a third aspect, disclosed above is a computer program product for ordering digital teaching content, the computer-implemented method including: a storage medium readable by a processor and storing instructions for performing a method, the method including: receiving, by a data processing system, digital teaching content and any corresponding annotations and content heuristic(s) from a teacher, the digital teaching content including at least one of text and image(s); monitoring, by the data processing system, student gaze of the digital teaching content during a class; and cognitively skipping, by the data processing system, some of the digital teaching content during the class based on the monitoring and the content heuristic(s).

In one example, the computer program product may further include, for example, cognitively modifying, by the data processing system, the digital teaching content outside of class based, in part, on the monitoring and the content heuristic(s), the receiving further includes receiving, by the data processing system, a hypergraph of the digital teaching content from the teacher, the cognitively skipping being further based on a heat map built using the hypergraph and the student gaze, and the cognitively modifying being further based on the hypergraph and the student gaze. In one example, the system may further include, for example, building, by the data processing system, heat map(s) from a sequence of gaze points of the student gaze, a predetermined unit of the digital teaching content is divided into zones, the monitoring includes tracking gaze time of the students on each of the zones, and the heat map(s) reflects the gaze time.

In one example, the computer program product of the third aspect may further include, for example, cognitively modifying, by the data processing system, the digital teaching content outside of class based, in part, on the monitoring and the content heuristic(s), the cognitively monitoring includes gathering, by the data processing system, a sequence of gaze points, the method further including building, by the data processing system, heat map(s) from the sequence of gaze points.

In one example, the computer program product of the third aspect may further include, for example: cognitively modifying, by the data processing system, the digital teaching content outside of class based, in part, on the monitoring and the content heuristic(s); and machine learning for the data processing system to improve at least one of the cognitively skipping and the cognitively modifying.

Figure 11:
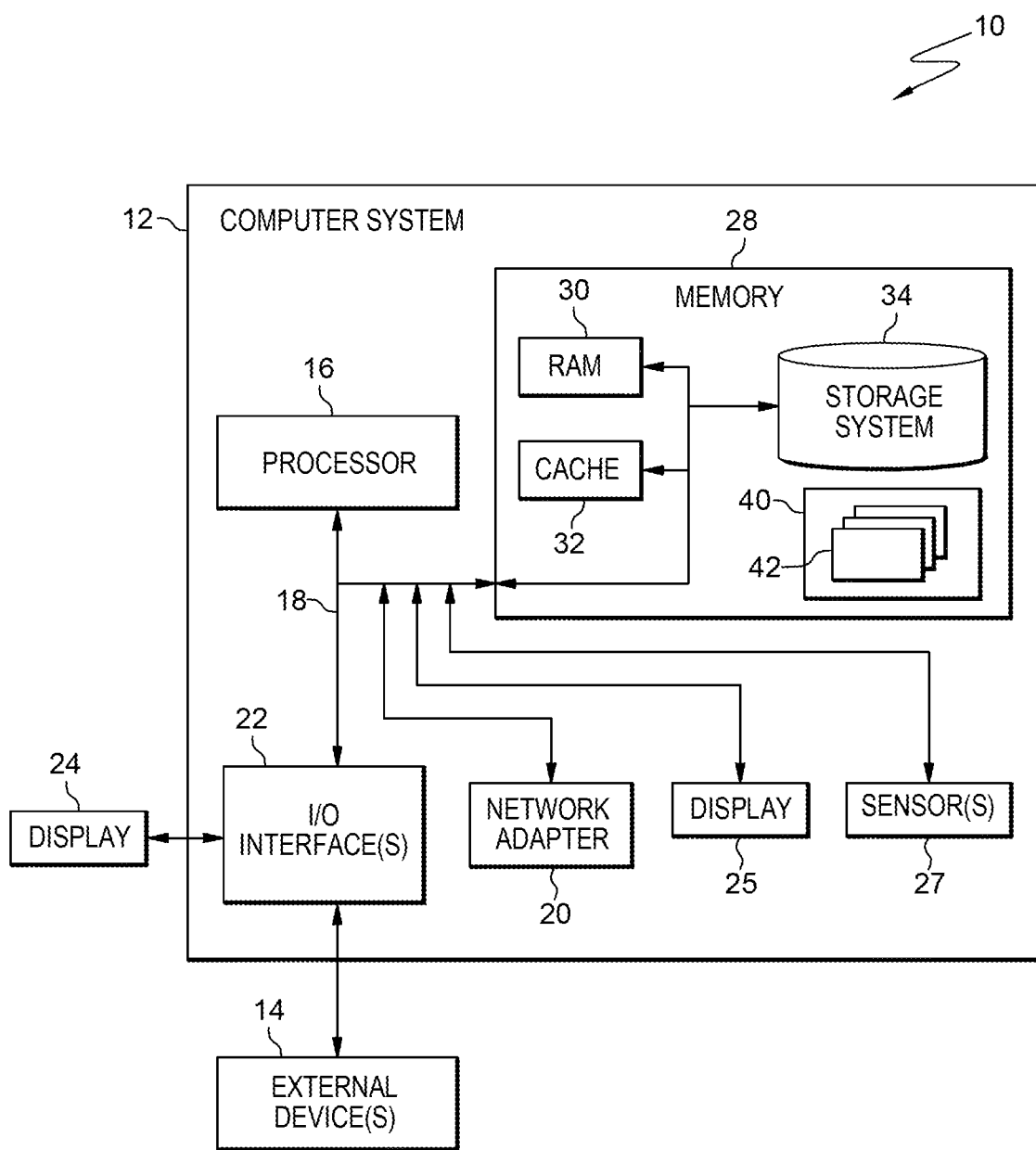
FIG. 11 is a block diagram of one example of a computer system, in accordance with one or more aspects of the present disclosure.
Figure 12:
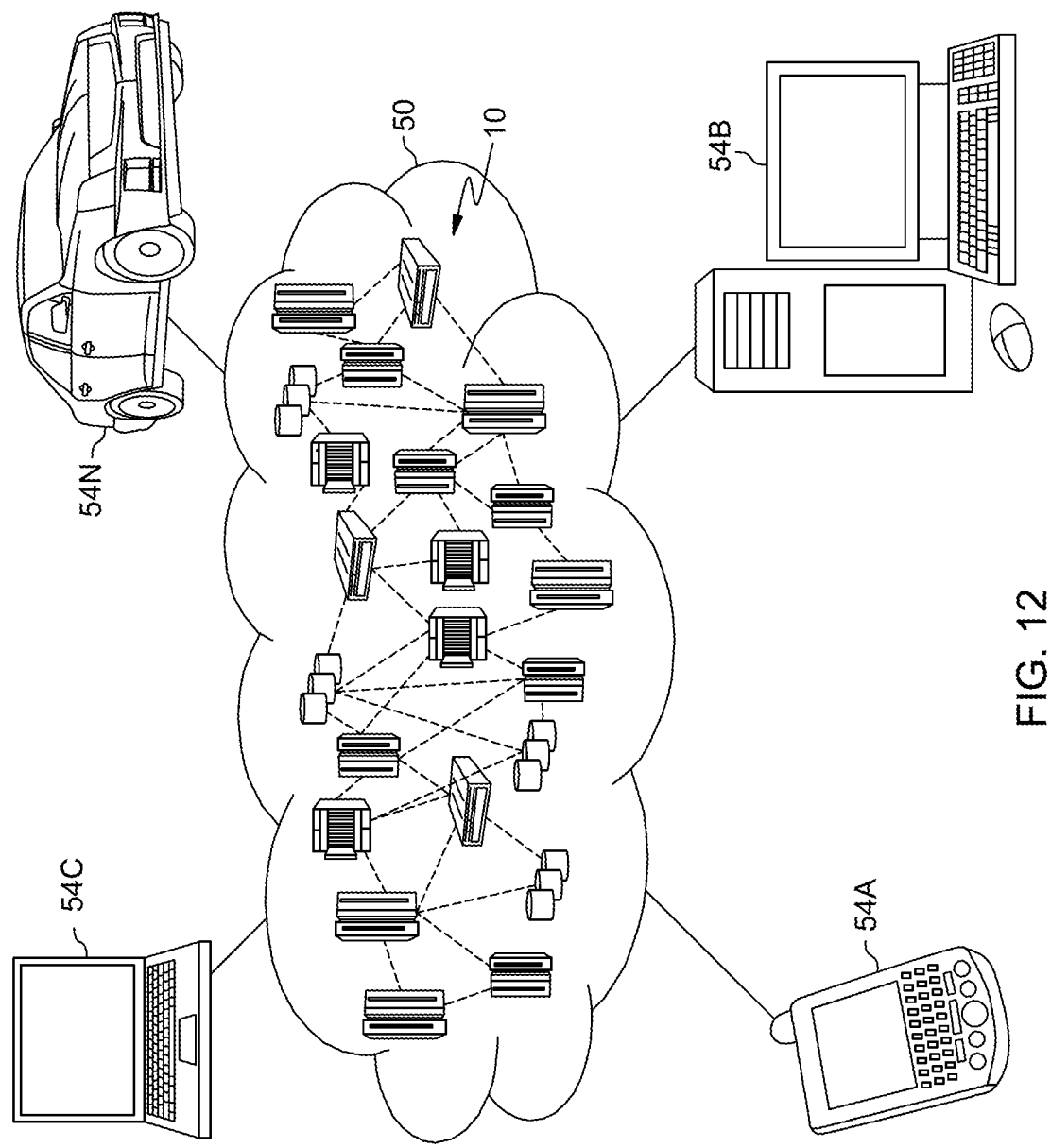
FIG. 12 is a block diagram of one example of a cloud computing environment, in accordance with one or more aspects of the present disclosure.
Figure 13:
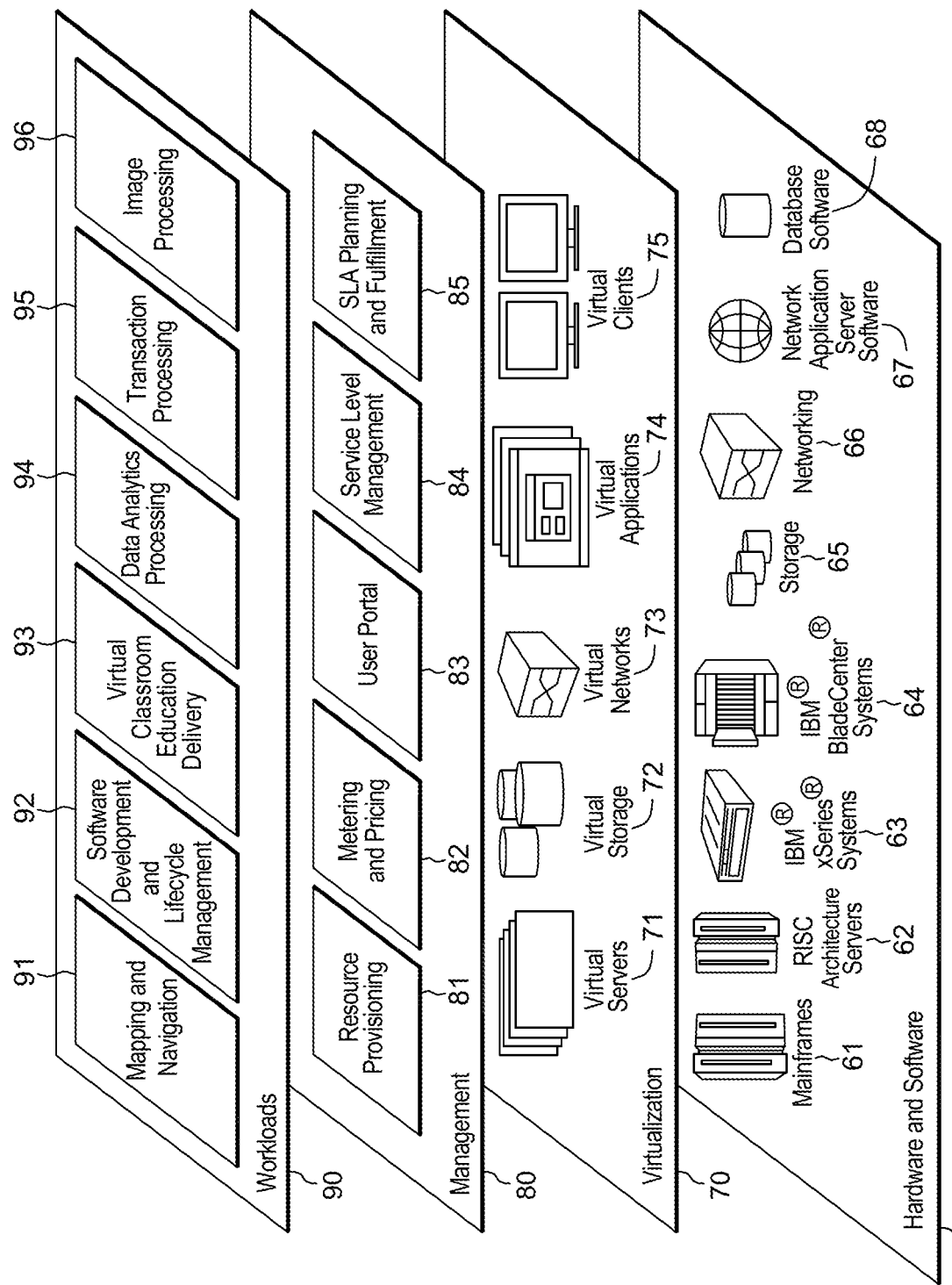
FIG. 13 is a block diagram of one example of functional abstraction layers of the cloud computing environment of FIG. 12, in accordance with one or more aspects of the present disclosure.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12 and 13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method, comprising:
   receiving, by a data processing system, digital teaching content arranged in an order and one or more content heuristics, wherein the digital teaching content comprises at least one of text and one or more images, and wherein the digital teaching content comprises a plurality of content items;
   monitoring, by the data processing system, user gaze of the digital teaching content in real time during a class by a plurality of users, wherein the monitoring comprises:
   detecting one or more reflections of light from at least one eye; and
   cognitively skipping, by the data processing system, at least one of the plurality of content items of the digital teaching content during the class based on the monitoring and the one or more content heuristics.

2. The computer-implemented method of claim 1, further comprising cognitively modifying, by the data processing system, the digital teaching content outside of the class based, in part, on the monitoring and the one or more content heuristics.

3. The computer-implemented method of claim 2, wherein the receiving further comprises receiving, by the data processing system, a hypergraph of the digital teaching content, wherein the cognitively skipping is further based on the hypergraph, and wherein the cognitively modifying is further based on a heat map built using the hypergraph and the user gaze.

4. The computer-implemented method of claim 2, wherein the cognitively modifying comprises at least one of generating new digital teaching content, removing at least one and less than all of the plurality of content items and reordering at least one of the plurality of content items.

5. The computer-implemented method of claim 4, wherein the cognitively modifying comprises determining, by the data processing system, a clarity parameter for one or more of the plurality of content items using, at least in part, the one or more content heuristics.

6. The computer-implemented method of claim 2, further comprising building, by the data processing system, one or more heat maps from a sequence of gaze points of the user gaze, wherein the plurality of content items are grouped into a plurality of units, wherein a predetermined unit of the plurality of units is divided into a plurality of zones, wherein the monitoring comprises tracking gaze time of the plurality of users on each of the plurality of zones, and wherein the one or more heat maps reflects the gaze time.

7. The computer-implemented method of claim 6, further comprising, prior to the cognitively skipping and the cognitively modifying, ordering, by the data processing system, the digital teaching content in descending order of attention based on the one or more heat maps.

8. The computer-implemented method of claim 2, further comprising using machine learning for the data processing system to improve at least one of the cognitively skipping and the cognitively modifying.

9. The computer-implemented method of claim 1, wherein the monitoring comprises gathering, by the data processing system, a sequence of gaze points, the computer-implemented method further comprising building, by the data processing system, one or more heat maps from the sequence of gaze points.

10. A system, comprising:
    a memory; and
    at least one processor in communication with the memory, the memory storing program code to perform operations, comprising:

receiving, by a data processing system, digital teaching content arranged in an order and one or more content heuristics, wherein the digital teaching content comprises at least one of text and one or more images, and wherein the digital teaching content comprises a plurality of content items;

monitoring, by the data processing system, user gaze of the digital teaching content in real time during a class by a plurality of users, wherein the monitoring comprises:

detecting one or more reflections of light from at least one eye; and cognitively skipping, by the data processing system, at least one of the plurality of content items of the digital teaching content during the class based on the monitoring and the one or more content heuristics.

11. The system of claim 10, further comprising cognitively modifying, by the data processing system, the digital teaching content outside of the class based, in part, on the monitoring and the one or more content heuristics, wherein the receiving further comprises receiving, by the data processing system, a hypergraph of the digital teaching content, wherein the cognitively skipping is further based on a heat map built using the hypergraph and the user gaze, and wherein the cognitively modifying is further based on the hypergraph and the user gaze.

12. The system of claim 11, further comprising building, by the data processing system, the heat map from a sequence of gaze points of the user gaze, wherein a predetermined unit of a plurality of units is divided into a plurality of zones, wherein the monitoring comprises tracking gaze time of the plurality of users on each of the plurality of zones, and wherein the heat map reflects the gaze time.

13. The system of claim 10, further comprising cognitively modifying, by the data processing system, the digital teaching content outside of the class based, in part, on the monitoring and the one or more content heuristics, wherein the cognitively monitoring comprises gathering, by the data processing system, a sequence of gaze points, the operations further comprising building, by the data processing system, one or more heat maps from the sequence of gaze points.

14. The system of claim 10, further comprising:
cognitively modifying, by the data processing system, the digital teaching content outside of the class based, in part, on the monitoring and the one or more content heuristics; and machine learning for the data processing system to improve at least one of the cognitively skipping and the cognitively modifying.

15. A computer program product, comprising:
a computer readable storage medium readable by a processor and storing instructions for performing operations, comprising:

receiving, by a data processing system, digital teaching content arranged in an order and one or more content heuristics, wherein the digital teaching content comprises at least one of text and one or more images, and wherein the digital teaching content comprises a plurality of content items;

monitoring, by the data processing system, user gaze of the digital teaching content in real time during a class by a plurality of users, wherein the monitoring comprises:

detecting one or more reflections from at least one eye resulting from an illuminating; and cognitively skipping, by the data processing system, at least one of the plurality of content items of the digital teaching content during the class based on the monitoring and the one or more content heuristics.

16. The computer program product of claim 15, further comprising cognitively modifying, by the data processing system, the digital teaching content outside of the class based, in part, on the monitoring and the one or more content heuristics, wherein the receiving further comprises receiving, by the data processing system, a hypergraph of the digital teaching content, wherein the cognitively skipping is further based on the hypergraph, and wherein the cognitively modifying is further based on a heat map built using the hypergraph and the user gaze.

17. The computer program product of claim 16, further comprising building, by the data processing system, the heat map from a sequence of gaze points of the user gaze, wherein the plurality of content items are grouped into a plurality of units, wherein a predetermined unit of the plurality of units is divided into a plurality of zones, wherein the monitoring comprises tracking gaze time of the plurality of users on each of the plurality of zones, and wherein the heat map reflects the gaze time.

18. The computer program product of claim 15, further comprising cognitively modifying, by the data processing system, the digital teaching content outside of the class based, in part, on the monitoring and the one or more content heuristics, wherein the monitoring comprises gathering, by the data processing system, a sequence of gaze points, the operations further comprising building, by the data processing system, one or more heat maps from the sequence of gaze points.

19. The computer program product of claim 15, further comprising:
cognitively modifying, by the data processing system, the digital teaching content outside of the class based, in part, on the monitoring and the one or more content heuristics; and using machine learning for the data processing system to improve at least one of the cognitively skipping and the cognitively modifying.

20. The computer-implemented method of claim 9, wherein the gathering comprises using, by the data processing system, at least one camera to observe one or more of the plurality of users in the class and obtain the sequence of gaze points.

21. The computer-implemented method of claim 1, wherein the monitoring comprises gathering, by the data processing system, a sequence of gaze points.

22. The system of claim 10, wherein the monitoring comprises gathering, by the data processing system, a sequence of gaze points.

23. The computer program product of claim 15, wherein the monitoring comprises gathering, by the data processing system, a sequence of gaze points.

24. The system of claim 10, wherein the monitoring comprises gathering, by the data processing system, a sequence of gaze points, the operations further comprising building, by the data processing system, one or more heat maps from the sequence of gaze points.

25. The computer program product of claim 15, wherein the monitoring comprises gathering, by the data processing system, a sequence of gaze points, the operations further comprising building, by the data processing system, one or more heat maps from the sequence of gaze points.

* * * * *